United States Patent [19]

Patton, Jr. et al.

[11] Patent Number: 4,555,530

[45] Date of Patent: Nov. 26, 1985

[54] HALOGENATED PHENOLIC POLYOLS AND RIGID CELLULAR COMPOSITIONS MADE THEREFROM

[75] Inventors: John T. Patton, Jr., Wyandotte, Mich.; John P. Rupert, Wadsworth, Ohio

[73] Assignee: BASF Wyandotte Corporation, Wyandotte, Mich.

[21] Appl. No.: 581,429

[22] Filed: May 7, 1984

Related U.S. Application Data

[62] Division of Ser. No. 458,286, Jan. 17, 1983, Pat. No. 4,448,952.

[51] Int. Cl.$^4$ .................................................. C08J 9/14
[52] U.S. Cl. ..................................... 521/131; 521/124; 521/127; 521/136; 521/158
[58] Field of Search ............... 521/170, 158, 171, 180, 521/902, 131, 155, 136

[56] References Cited

U.S. PATENT DOCUMENTS

| | | | |
|---|---|---|---|
| 3,242,107 | 3/1966 | Bunze et al. | 521/177 |
| 3,432,457 | 3/1969 | Robins | 521/177 |
| 3,546,253 | 12/1970 | Carpenter et al. | 521/171 |
| 3,632,531 | 1/1972 | Rush et al. | 521/170 |
| 3,661,814 | 5/1972 | Smith et al. | 528/129 |
| 3,674,732 | 7/1972 | Pitzalis et al. | 528/139 |
| 3,948,824 | 4/1976 | Robins | 521/171 |
| 4,293,658 | 10/1981 | Raden et al. | 521/170 |

FOREIGN PATENT DOCUMENTS 2033413  8/1980  United Kingdom .

*Primary Examiner*—Morton Foelak
*Assistant Examiner*—Garnette D. Draper
*Attorney, Agent, or Firm*—Joseph D. Michaels

[57] ABSTRACT

Modified benzyl ether-containing resole polyols derived from a phenolic component, a non-aqueous aldehyde, and a halogen-containing aliphatic hydroxyl component are prepared using a metal derivative as a catalyst. These polyols react with organic polyisocyanates to yield closed cell, low friability, low combustibility, rigid polyurethane foams without the need for post curing at elevated temperature. They are also useful in the preparation of modified rigid polyisocyanurate foams.

5 Claims, No Drawings

HALOGENATED PHENOLIC POLYOLS AND RIGID CELLULAR COMPOSITIONS MADE THEREFROM

This is a division of application Ser. No. 458,286, filed Jan. 17, 1983 now U.S. Pat. No. 4,448,952.

CROSS REFERENCE TO RELATED APPLICATION

Co-pending U.S. patent application Ser. No. 581,428, now U.S. Pat. No. 4,473,669, filed 2-17-84, deals with related subject matter.

BACKGROUND OF THE INVENTION

1. Field of the Invention

This invention relates to phenol/aldehyde-based polyols and to rigid cellular compositions derived from these polyols. Specifically it deals with modified benzylic ether-containing resole polyols and the rapid curing, low combustibility, low friability, closed cell, rigid cellular plastic compositions obtained by reaction of the polyols with polyisocyanates.

2. Description of the Prior Art

Our co-pending U.S. patent application, Ser. No. 581,428, now U.S. Pat. No. 4,473,669, which is incorporated herein by reference, distinguishes in detail between resoles, novolacs, and benzyl ether-containing resins—all of which are known in the prior art. Resoles, which are made with excess aldehyde (relative to phenol) under alkaline catalysis, have numerous hydroxymethyl substituents on the phenol rings. Novolacs, which are made with a molar excess of phenol (relative to aldehyde) under acid catalysts have no (or very few) hydroxymethyl substituents. Benzyl ether-containing resins (U.S. Pat. No. 3,485,797; Frazer, et al, *Journal of Applied Chemistry*, 7, 689 (1957) are obtained using certain metal salts as catalysts and can be made with (resole) or without (novolac) hydroxymethyl substituents, depending on the ratio of phenol and aldehyde.

Such prior art phenol/aldehyde condensates can be further polymerized (novolacs require added aldehyde) to phenolic foams which have excellent inherent flame retardancy but are opened cell and friable. The excellent inherent flame retardancy has motivated a desire to incorporate phenolic structure in rigid polyurethane foam.

Use of benzyl ether-containing resins as polyols in the preparation of rigid polyurethane foams, as disclosed in U.S. Pat. No. 3,948,824, results in foams which were slow to cure and friable. Desirable strength and friability properties could be achieved by post-curing the foams at elevated temperature (U.S. Pat. No. 4,293,658 and Schafer, et al, *Journal of Cellular Plastics*, 1978, 147). The latter requirement makes such systems unsuitable for processing on commonly available commercial foam equipment.

SUMMARY OF THE INVENTION

A modified benzyl ether-containing resole polyol obtained by reacting at a temperature of 100° to 130° C. a mixture comprising
(a) a phenolic component consisting of phenol or a mixture of phenol and phenol which is substituted in the meta or para position with halogen, $C_1$–$C_{12}$ alkyl, or halogen-substituted alkyl of 1 to 6 carbon atoms;
(b) a molar excess relative to the phenolic component of a non-aqueous aldehyde having the formula RCHO wherein R is hydrogen, alkyl of 1 to 5 carbon atoms, or halogenated alkyl of 1 to 5 carbon atoms;
(c) less than fifty mole percent relative to the phenolic component of a hydroxylic component consisting of one or more aliphatic hydroxyl compounds which contain 1 to 4 hydroxyl groups, 1 to 12 carbon atoms, and 0 to 5 ether oxygen atoms wherein the hydroxylic component contains at least 15 mole percent of a halogenated alcohol having 2 to 4 carbon atoms and at least 60 weight percent of halogen having an atomic number of 17 to 35; and
(d) a catalytically effective amount of divalent metal carboxylate salt in which the metal is selected from the group consisting of zinc, lead, cadmium, magnesium, cobalt, iron, nickel, calcium, barium, manganese, or dibutyltin, and the carboxylate ions each contain 1 to 20 carbon atoms.

Based on $H^1$ and $C^{13}$ nuclear magnetic resonance and infrared spectra, these polyols are mixtures comprising compounds of the following formula:

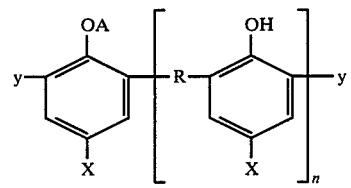

where
n is 0, 1, 2, 3, 4, or higher;
X is hydrogen, halogen, $C_1$–$C_{12}$ alkyl, or mixtures thereof;
y is hydrogen or —CH(R')OA;
R' is hydrogen or $C_1$–$C_5$ alkyl;
R is —CH(R')OCH(R')— or a mixture —CH(R')—O—CH(R')— and —CH(R')— in which the ratio of ether-containing groups to alkylidene groups is greater than 1 and R' is as stated above;
A is a mixture of hydrogen and a radical or radicals resulting from removal of a hydroxyl group from aliphatic hydroxyl compounds having 1 to 4 hydroxyl groups, 1 to 12 carbon atoms, and 0 to 5 ether oxygen atoms wherein the amount of such radicals is at least 5 but less than 35 mole percent of the phenol moieties present and the radical mixture contain at least 15 mole percent of radicals from halogenated alcohols having 2 to 4 carbon atoms and a minimum of 60 weight percent of substituent halogen having an atomic number of 17 to 35.

Rigid polyurethane foams prepared by reaction of these polyols with organic polyisocyanate cure rapidly at room temperature and have excellent fire retardancy, friability (strength) and insulation (closed-cell) properties.

DESCRIPTION OF THE PREFERRED EMBODIMENT

The modified benzyl ether-containing resole polyols of this invention are prepared by the metal salt catalyzed reaction of a phenol with a molar excess of non-aqueous aldehyde and a modifying quantity of aliphatic hydroxylic component which contains a halogenated alcohol.

The general procedure for the production of these polyols is to charge the phenol, non-aqueous aldehyde, modifying aliphatic hydroxylic component, and catalyst to a stirred reactor fitted with a condenser system which is suitable for either reflux or distillate removal. The reactor is also provided for heating, cooling, and operation under reduced pressure. The stirred mixture is heated to 110° C. and held at this temperature for several hours until reflux starts. Distillate (water resulting from reaction) is then withdrawn over a period of several hours while the temperature of the reaction mass increases to 122° C. At this point, the reactor is returned to total reflux and heating is continued. The reaction is followed by periodic analysis of the reaction mixture for water. When the water content exceeds 4 weight percent, the reaction mixture is rapidly cooled and stripped at reduced pressure to a water content of less than 1 weight percent.

Phenols which are suitable for use in the preparation of these products are those which are unsubstituted in the ortho positions but which may be substituted in the meta or para positions with halogen, $C_1$ to $C_{12}$ alkyl, or halogen-substituted alkyl of 1 to 6 carbon atoms. Examples of such phenols are phenol, p-cresol, p-tertiary butylphenol, p-chlorophenol, p-bromophenol, p-trifluoromethylphenol, p-(2,3-dibromopropyl)phenol; 3,5-xylenol; 3,5-dichlorophenol, p-dodecylphenol, p-trichloromethylphenol, p-nonylphenol, as well as mixtures of any of the foregoing. The preferred phenolic reactant is phenol itself or phenol mixed with a minor amount of the aforementioned substituted phenols.

Aldehydes which are suitable for use in the preparation of the polyols of this invention are aliphatic or halogenated aliphatic aldehydes having the formula RCHO where R is hydrogen, alkyl of 1 to 5 carbon atoms, or halogenated alkyl of 1 to 5 carbon atoms. Examples of such aldehydes are formaldehyde, acetaldehyde, pivaldehyde, hexanal, chloral, and 2,3-dibromopropanal. The preferred aldehyde is formaldehyde. The aldehyde is used in a non-aqueous state such as paraformaldehyde, trioxane, paraldehyde, or chloral.

The desired phenol/aldehyde condensate is one possessing hydroxymethyl substituents and, therefore, use of a molar excess of aldehyde is indicated. The useful mole ratio is from 1.1 mole to 2.25 moles of aldehyde per mole of phenol. When the mole ratio falls below 0.9, the condensate becomes more "novolac" in structure (lacking hydroxymethyl substituents) and as the mole ratio approaches three, more para substitution and/or crosslinking occurs. The preferred mole ratios of aldehyde to phenol range from 1.2 to 1.8.

The aliphatic hydroxylic component suitable for preparation of the modified benzylic ether-containing resole polyols of this invention comprises halogen-containing alcohols which have 2 to 4 carbon atoms and at least 60 weight percent chlorine or bromine. Optionally such halogenated alcohols can be used in mixtures with other aliphatic hydroxyl compounds. The latter contain 1 to 4 hydroxyl groups, 1 to 12 carbon atoms, and 0 to 5 ether oxygen atoms. When used in such a mixture, the halogenated alcohol amounts to at least 15 mole percent of the hydroxylic component. Examples of halogenated alcohols suitable for use in this invention are 2,2,2-trichloroethanol; 2,3-dibromopropanol; 4,4,4-trichlorobutanol; 3,3-dibromo-4,4-dichlorobutanol; 4,4,4,2-tetrachlorobutanol; 3,3,3-trichloropropanol; 2,2,2-tribromoethanol. Examples of other aliphatic hydroxyl compounds suitable for use in mixtures with the halogenated alcohols in this invention are methanol, ethanol, butanol, ethylene glycol, diethylene glycol, propylene glycol, trimethylene glycol, 1,4-butanediol, 2,3-butanediol, 1,3-butanediol, 1,12-dodecanediol, 1,2,5-hexanetriol, trimethylolpropane, pentaerythritol, tripropylene glycol, and hexaethylene glycol.

The preferred halogenated alcohols are trichloroethanol, dibromopropanol, and tetrachlorobutanol while the preferred aliphatic hydroxyl compounds for co-reaction are 1,4-butanediol and diethylene glycol.

The amount of modifying hydroxylic component used is governed by the amount required to achieve improvement in the normal high friability and opened cell structure characteristic of phenolic foams and limited by the amount which would obscure the flame retardancy contribution of the phenol structure and obviate its use. Below about one mole percent of hydroxyl compounds, based on the amount of phenol present, the hydroxyl component is in effective in improving strength and friability properties. Above about 50 mole percent on the same basis, the hydroxylic component obscures the flame retardant contribution of the phenolic structure. Thus, a useful range of concentration for the hydroxylic component is from about 1 to 50 mole percent of the phenol compound used. The preferred range is 5 to 25 mole percent.

The catalyst used in the preparation of the modified benzylic ether-containing resole polyols of this invention is selected from the $C_1$ to $C_{20}$ carboxylic acid salts of divalent ions of Mg, Ca, Ba, Cd, Mn, Fe, Co, Ni, Zn, Pb and dialkyltin where each alkyl group contains 1 to 5 carbon atoms. Examples of suitable catalysts include lead naphthenate, zinc neodecanoate, cobalt naphthenate, manganese valerate, ferrous lactate, cadmium acetate, zinc benzoate, zinc acetate, dibutyltin dilaurate, dimethyltin diacetate, and lead butyrate. The preferred catalysts are zinc neodecanoate, lead naphthenate, and dibutyltin dilaurate. The catalyst used in the polyol preparation is not removed or neutralized and remains in the product.

Metal derivatives are effective as catalysts at concentration of 0.01 to 0.10 weight percent metal based on the total charge. The preferred catalyst level is 0.04 to 0.07 weight percent metal.

No solvent is needed for this reaction. Although certain solvents can be used as entrainment agents to facilitate the removal of water, we have found this to be unnecessary. Water is easily removed, essentially as it forms, simply by maintaining the reaction mixture at or near a temperature of 120° C.

The modified benzyl ether-containing resole polyols prepared with the above indicated preferred materials have viscosities of less than 1,500,000 cps at 25° C. and generally in the range of 5000 to 650,000 cps at 25° C. The hydroxyl number values of the products, determined by the phenyl isocyanate method, generally range from 375 to 675, mostly in the 500 to 600 range.

The rigid cellular compositions derived from these novel polyols are made by state of the art techniques and are "phenolic" containing polymers with superior properties requiring no special treatment or equipment for their manufacture. Thus, like any ordinary polyol, they can be reacted with organic polyisocyanates in the presence of the usual urethane catalysts using water or volatile organic blowing agents along with surfactants, plasticizers, fillers, or other additives. Reaction is achieved by intensely mixing the ingredients for a brief period and allowing the mixture to react. The products cure rapidly at room temperature without application of heat. Similarly, the polyols can be used in the manufacture of urethane-modified polyisocyanurate foams by using a large molar excess ("high index") of polyisocyanate, a blowing agent, a surfactant, and an isocyanurate catalyst such as potassium acetate or tris(dimethylaminopropyl)hexahydrotriazine.

Suitable polyisocyanates for manufacture of these novel rigid cellular plastics are any organic di- or higher functionality isocyanate which is reactive with Zerewitt-inoff type hydrogen atoms. Examples of such isocyanates are hexamethylene diisocyanate, 1,3- or 1,4-cyclohexane diisocyanate, 3-isocyanatomethyl-3,5,5-trimethylcyclohexane isocyanate, 2,2'-, 2,4'-, or 4,4'-dicyclohexylmethane diisocyanate, 1,3- or 1,4-bis-(isocyanatomethyl)cyclohexane, m- or p-xylylene diisocyanate, 2,4- or 2,6-toluene diisocyanate, 2- or 4-methyl-1,3-cyclohexane diisocyanate, 1,3,5-tris(6-isocyanatohexyl)isocyanurate, N,N'N"-tris(6-isocyanatohexyl)biuret, 2,2'-, 2,4'- or 4,4'-diphenylmethane diisocyanate, 2,2'-, 2,4'- or 4,4'-diphenyl diisocyanate, 3,3'-dimethyl-2,2'-, 2,4'- or 4,4'-diphenylmethane diisocyanate, bis(4-isocyanatophenyl) ether or sulfide, polyphenyl polymethylene polyisocyanate, or mixtures of any of the aforementioned isocyanates. Aromatic polyisocyanates are preferred and in particular the mixture of diphenylmethane diisocyanate isomers with polyphenyl polymethylene polyisocyanates ("crude MDI") is the isocyanate of choice.

The catalysts used for polyurethane formation are those known in the art and consist of tertiary amines, metal salts, or mixtures thereof. Examples of such suitable catalytic compounds are triethylamine, dimethylaminoethanol, N,N,N', N'-tetraethylethylenediamine, N,N,N',N'-tetramethyl-1,3-butanediamine, bis(dimethylaminoethyl)ether, N,N-dimethyl-3-dimethylaminopropionamide, 1,4-diaza[2.2.2]-bicyclooctane, N-methyl- or ethylmorpholine, stannous oleate, stannous 2-ethylhexanoate, dibutyltin dilaurate, dibutyltin dilauryl mercaptide, dibutyltin diacetate, lead naphthenate, zinc stearate, or mixtures thereof. Amine catalysts are preferred and the most preferred catalyst is diazabicyclooctane.

Blowing agents suitable for use in the preparation of these polyurethane foams are water (which reacts with the isocyanate to form carbon dioxide) and volatile low boiling organic compounds. Examples of such compounds are alkanes such as pentane or hexane, oxygenated compounds such as methyl formate, halogenated aliphatic compounds such as fluorotrichloromethane or methylene dichloride. The preferred blowing agents are water, methylene dichloride, fluorotrichloromethane (Refrigerant 11), or mixtures thereof.

Suitable surfactants to serve as emulsifying agents or cell stabilizers in the manufacture of these polyurethane foams are alkylarylsulfonates such as sodium dodecylbenzenesulfonate, alkali metal or ammonium salts of alcohol sulfates such as potassium lauryl sulfate or ammonium salt of sulfated castor oil, oxyethylated fatty alcohols or acids such as oxyethylated tetradecanol containing 63 percent oxyethylene by weight, or silicone surfactants such as polyalkylsiloxane-polyoxyalkylene block copolymers. The preferred surfactants are the silcone surfactants.

Plasticizers such as tris(chloroethyl) phoshate or didecylphthalate may be incorporated into the foam if desired.

Chain extenders such as low molecular weight diols may be used in quantity of less than 10 percent by weight of the polyol. Such low molecular weight diols can also serve to reduce the polyol viscosity for use in machine foaming.

The foams obtained by the practice of this invention are rapid curing, rigid, closed-cell polyurethanes which show good strength and flammability properties.

The following examples show the preferred embodiments of this invention in greater detail. In the examples, all parts given are by weight unless otherwise specified. The test results reported are based on the following ASTM test:

Tumb. Friab. = tumbling friability test (C421)
Butler Chimney = combustion test (D3014)
K-Factor = thermal insulation test (C518)
10% Comp. Strength = force for 10% compression (D1621)
NBS Smoke = maximum smoke density (E662).

Materials used in foam formulations are:
DC-193—a polyoxyalkylene-polydialkyl-siloxane block copolymer sold by Dow Corning Company
F-11A—stabilized fluorotrichloromethane—a refrigerant sold by DuPont Company
PAPI 135—a polymethylene polyphenylene polyisocyanate/diphenylmethane diisocyanate mixture (functionality of 2.7) sold by Upjohn Company
DABCO R8020—a tertiary amine catalyst consisting of 20 percent diazabicyclooctane and 80 percent dimethylamineoethanol sold by Air Products and Chemicals Company, Houdry Division.

EXAMPLE 1

A mixture of 545.3 parts of phenol, 321.1 parts of 91 percent paraformaldehyde, 41.0 parts p-nonylphenyl, 30.1 parts of 2,3-dibromopropanol, 60.1 parts of 1,4-butanediol, and 2.4 parts of lead naphthenate (24 percent Pb) was stirred in a reactor fitted with a mechanical stirred, a thermometer, and a condenser system for either reflux or take off of distillate. The mixture was heated to 110° C. and held at this temperature until reflux began (about six hours). Over the following 3.5 hours, 72 parts of distillate (water) was taken off while the reaction temperature slowly increased to 122° C. The reaction was then placed on total reflux and periodically analyzed for water content. During six hours at total reflux the water content increased to 4.3 percent. The mixture was then stripped to final condition of 96° C. and less than 1 mm Hg pressure. The stripped product had a hydroxyl number of 498 and a water content of 0.19 percent.

EXAMPLE 2

The procedure of Example 1 was repeated with the exception that the dibromopropanol-butanediol charge was replaced with 90.2 parts of 2,2,2-trichloroethanol. The stripped product had a hydroxyl number of 535 and a water content of 0.11 percent.

COMPARATIVE EXAMPLE A

The procedure of Example 1 was repeated except that the dibromopropanol charge was replaced with an equal weight of 1,4-butanediol so that the total charge of butanediol was 90.2 parts. The stripped product had a hydroxyl number of 508 and a water content of 0.99 percent.

COMPARATIVE EXAMPLE B

A product was prepared according to our copending application by reacting a mixture of 576.2 parts of phenol, 331.2 parts of 91 percent paraformaldehyde, and 90.2 parts of 1,4-butanediol using 2.4 parts of lead naphthenate (24 percent Pb) as catalyst. The stripped product obtained after removal of water under vacuum had a hydroxyl number of 503 and contained 0.78 weight percent water.

COMPARATIVE EXAMPLE C

A product based on prior art was prepared according to Example 1 of U.S. Pat. No. 3,485,797 from a mixture of 634.2 parts phenol, 364.5 parts of 91 percent paraformaldehyde in the presence of 0.9 parts lead naphthanate (24 percent Pb) and 0.4 parts PbO as catalyst. The stripped product had a hydroxyl number of 593 and a water content of 1.1 weight percent.

PREPARATION OF POLYURETHANE FOAMS

Using the formulations given in Table I, each of the polyols described in the prior examples was used to prepare a rigid polyurethane form. In each case the polyol, surfactant, catalyst, and auxilary blowing agent were charged to a cup and vigorously mixed for 30 seconds until homogeneous. The isocyanate was then added and the stirring continued for 5 to 10 seconds and the blended formulation poured into an open container and allowed to rise. The foams became dry to the touch rapidly without any external heat. The properties of the foams obtained are summarized in Table I.

Note that the prior art polyol of Comparative Example C yielded a foam which was poor in friability, insulation (K-factor) and flammability properties. Polyols based on the process of our co-pending application (Comparative Examples A and B) gave foams which were much improved in these properties. It is also apparent from these results that the use of nonylphenol reduces the flame resistance (product A compared to product B). Replacement of the butanediol component (partially in Example 1 and completely in Example 2) with halogenated alcohols resulted in polyols which yielded foams with improved properties even when nonylphenyl was used as part of the phenolic reactant.

TABLE I

| | Example | | | | |
|---|---|---|---|---|---|
| | 1 | 2 | A | B | C |
| | | | (Comparative Examples) | | |
| Polyol Preparation: (pbw) | | | | | |
| Phenol | 545.25 | 545.25 | 545.25 | 576.2 | 634.2 |
| p-Nonylphenol | 41.04 | 41.04 | 41.04 | — | — |
| Paraformaldehyde (91 percent) | 321.10 | 321.10 | 321.10 | 331.2 | 364.5 |
| 1,4-Butanediol | 60.13 | — | 90.20 | 90.2 | — |
| 2,3-Dibromopropanol | 30.07 | — | — | — | — |
| 2,2,2-Trichloroethanol | — | 90.20 | — | — | — |
| Lead Naphtenate (24 percent) | 2.41 | 2.41 | 2.41 | 2.4 | 0.9[1] |
| Polyol Properties: | | | | | |
| Hydroxyl number | 498 | 535 | 508 | 503 | 593 |
| Water content, weight % | 0.19 | 0.11 | 0.99 | 0.78 | 1.1 |
| Foam Formulation: (pbw) | | | | | |
| Polyol | 100[2] | 100 | 100[2] | 100 | 100 |
| DC-193 | 6.0 | 3.0 | 9.0 | 3.0 | 3.4 |
| DABCO R-8020 | 0.5 | 0.3 | 0.5 | 0.5 | 0.25 |
| F-11A | 47.6 | 48.4[3] | 43.6 | 27.7 | 51.4 |
| PAPI 135 (120 Index) | 147.2 | 156.5 | 164.5 | 158 | 169 |
| Foam Properties: | | | | | |
| Density, pcf | 1.78 | 1.73 | 1.97 | 2.27 | 1.69 |
| Tumb. Friability; % wt. change | −3.6 | −8.2 | −4.2 | −4.0 | −100 |
| K-Factor | 0.131 | 0.137 | 0.122 | 0.129 | 0.176 |
| Butler Chimney, % wt. retained | 74.7 | 86.2 | 64.6 | 85.9 | 51.8 |
| 10% Compression strength, psi | 34.7 | 21.2 | 46.1 | 53.2 | — |
| NBS Smoke, $D_m$ | 93 | — | 104 | — | — |

[1] Also contained 0.39 parts PbO
[2] Formulation contained 6 parts dipropylene glycol in addition
[3] Contains 20 percent methylene chloride The embodiments of the invention in which an exclusive privilege or property is claimed are defined as follows:

1. A rigid cellular composition obtained by reacting, in the presence of a polymerization catalyst and a blowing agent, (1) an organic polyisocyanate with (2) a modified high ortho-benzyllic ether-containing resole polyol (2), said polyol obtained by a process comprising reacting, at a temperature of 100° C. to 130° C., a mixture of (a) a phenolic component comprising phenol or a mixture of phenol and a phenol which is substituted in the meta or para position with halogen, $C_1$–$C_{12}$ alkyl, or halogen-substituted alkyl of 1 to 6 carbon atoms;

(b) a molar excess relative to the phenolic component of a non-aqueous aldehyde having the formula RCHO where R is hydrogen, alkyl of 1 to 5 carbon atoms, or halogenated alkyl of 1 to 5 carbon atoms;

(c) less than 50 mole percent relative to the phenolic component of a hydroxylic component having one or more aliphatic hydroxyl compounds which contain 1 to 4 hydroxyl groups, 1 to 12 carbon atoms, and 0 to 5 ether oxygen atoms wherein the hydroxylic component contains at least 15 mole percent of a halogenated alcohol having 2 to 4 carbon atoms and at least 60 weight percent of halogen having an atomic number of 17 to 35; and (d) an effective amount of a metal salt catalyst.

2. The composition of claim 1 wherein the metal salt catalyst, (d), is selected from the group consisting of zinc neodecanoate, lead naphthanate, and dibutyltin dilaurate.

3. The composition of claim 2 wherein the polymerization catalyst is a polyurethane formation catalyst, the organic polyisocyanate, (1), is polymethylene polyphenylene polyisocyanate, and the amounts of (1) and (2) used are such that the ratio of isocyanate groups to hydroxyl groups is from 0.95:1 to 1.2:1.

4. The composition of claim 3 wherein the blowing agent used is selected from the group consisting of water, low boiling chlorofluorohydrocarbons, methylene chloride, or mixtures thereof.

5. The composition of claim 4 wherein the modifying hydroxylic component, (c), is trichloroethanol.

* * * * *